United States Patent
Duan

(10) Patent No.: US 10,803,332 B2
(45) Date of Patent: Oct. 13, 2020

(54) TRAFFIC SIGN DETECTION METHOD, APPARATUS, SYSTEM AND MEDIUM

(71) Applicant: BOE TECHNOLOGY GROUP CO., LTD., Beijing (CN)

(72) Inventor: Ran Duan, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/288,559

(22) Filed: Feb. 28, 2019

(65) Prior Publication Data

US 2019/0370573 A1 Dec. 5, 2019

(30) Foreign Application Priority Data

May 31, 2018 (CN) .......................... 2018 1 0549496

(51) Int. Cl.
| | | |
|---|---|---|
| *H04W 4/029* | (2018.01) | |
| *G08G 1/097* | (2006.01) | |
| *H04W 4/46* | (2018.01) | |
| *G08G 1/0965* | (2006.01) | |
| *G06K 9/00* | (2006.01) | |
| *G06F 3/01* | (2006.01) | |
| *H04W 4/44* | (2018.01) | |
| *B60R 1/00* | (2006.01) | |

(52) U.S. Cl.
CPC ......... *G06K 9/00818* (2013.01); *G06F 3/013* (2013.01); *G06K 9/00308* (2013.01); *G08G 1/097* (2013.01); *H04W 4/029* (2018.02); *B60R 1/00* (2013.01); *H04W 4/44* (2018.02); *H04W 4/46* (2018.02)

(58) Field of Classification Search
CPC .................................................. G06K 9/00818
See application file for complete search history.

(56) References Cited

U.S. PATENT DOCUMENTS

| | | | |
|---|---|---|---|
| 2008/0240506 A1 | 10/2008 | Nakamura et al. | |
| 2009/0285445 A1* | 11/2009 | Vasa .................... | G01C 21/26 382/100 |
| 2010/0253541 A1* | 10/2010 | Seder .................... | G01S 13/723 340/905 |
| 2017/0148320 A1* | 5/2017 | Ro ........................ | G06K 9/00818 |
| 2017/0177957 A1* | 6/2017 | Yokochi ................ | H04N 5/77 |
| 2017/0178591 A1* | 6/2017 | Takatsudo ............. | B60K 35/00 |

FOREIGN PATENT DOCUMENTS

| | | |
|---|---|---|
| CN | 101212307 A | 7/2008 |
| CN | 105957379 A | 9/2016 |
| CN | 205942731 | 2/2017 |
| CN | 106504550 A | 3/2017 |
| CN | 106657976 A | 5/2017 |

OTHER PUBLICATIONS

First Chinese Office Action dated Mar. 2, 2020, received for corresponding Chinese Application No. 201810549496.6, 44 pages.

* cited by examiner

*Primary Examiner* — Emily C Terrell
*Assistant Examiner* — Pameshanand Mahase
(74) *Attorney, Agent, or Firm* — Kinney & Lange, P.A.

(57) ABSTRACT

The present disclosure provides a traffic sign detection method, apparatus, system and medium. The method includes: determining geographic location information of a to-be-detected traffic sign; sending a request message for requesting for obtaining sign formation of the traffic sign, where the request message includes the geographic location information; and receiving the sign formation of the traffic sign corresponding to the geographic location information.

10 Claims, 8 Drawing Sheets

TRAFFIC SIGN DETECTION METHOD, APPARATUS, SYSTEM AND MEDIUM

CROSS-REFERENCE TO RELATED APPLICATION

This application is based on and claims priority of Chinese Patent Application No. 201810549496.6, filed on May 31, 2018, which is incorporated herein by reference in its entirety.

TECHNICAL FIELD

The present disclosure relates to the field of vehicle technologies, and in particular to a traffic sign detection method, apparatus, system and medium.

BACKGROUND

As technologies have developed, vehicles have become more and more popular and have become indispensable for transportation and travel. The presence of traffic signs is mainly used to alert drivers or road guidance information. However, due to long distances between drivers and traffic sign, drivers may not be able to see the traffic sign on a traffic sign board at night, which easily leads to traffic hazards.

SUMMARY

According to a first aspect, one embodiment of the present disclosure provides a traffic sign detection method. The traffic sign detection method includes: determining geographic location information of a to-be-detected traffic sign; sending a request message for requesting for obtaining sign formation of the traffic sign, wherein the request message includes the geographic location information; and receiving the sign formation of the traffic sign corresponding to the geographic location information.

In one embodiment, the determining geographic location information of a to-be-detected traffic sign, includes: determining whether a user has a detection requirement for the traffic sign according to the user's sight; and determining the geographic location information of the traffic sign when determining that the user has the detection requirement for the traffic sign.

In one embodiment, the determining whether a user has a detection requirement for the traffic sign according to the user's sight, includes: determining first position information of the traffic sign in a coordinate system with the user's eye as an origin; determining second position information of an intersection point between the user's sight and a front windshield glass of a vehicle in the coordinate system with the user's eye as the origin; and determining that the user has the detection requirement for the traffic sign when the first position information and the second position information satisfy a preset relationship.

In one embodiment, the determining first position information of the traffic sign in a coordinate system with the user's eye as an origin, includes: determining, by a binocular camera mounted on the vehicle, first position coordinates of the traffic sign in a coordinate system with the binocular camera as the origin; determining, by an eye-tracking device mounted on the vehicle, second position coordinates of the user's eyes in a coordinate system with the eye-tracking device as the origin; converting the first position coordinates into third position coordinates in the coordinate system with the user's eye as the origin, according to the second position coordinates and a position relationship between the binocular camera and the eye-tracking device; and determining the third position coordinates as the first position information of the traffic sign.

In one embodiment, the determining second position information of an intersection point between the user's sight and a front windshield glass of a vehicle in the coordinate system with the user's eye as the origin, includes: calibrating the user's sight with an eye-tracking device mounted on the vehicle, thereby determining focus points of the user's eyes when the user views different positions; determining fourth position coordinates of the intersection point between the user's sight and the front windshield glass of the vehicle in the coordinate system with the user's eye as the origin, according to the focus points of the user's eyes when the user views different positions; and determining the fourth position coordinates as the second position information of the intersection point.

In one embodiment, the determining that the user has the detection requirement for the traffic sign when the first position information and the second position information satisfy a preset relationship, includes: continuing to determine whether the user's eyes meet conditions which indicates that the user has the detection requirement for the traffic sign, when the first position information and the second position information satisfy the preset relationship; and determining that the user has the detection requirement for the traffic sign, when determining that the user's eyes meet conditions which indicates that the user has the detection requirement for the traffic sign.

In one embodiment, the preset relationship includes that a position of the user's eyes, a position of the intersection point between the user's sight and the front windshield glass of the vehicle and a position of the traffic sign are on an identical straight line; and the continuing to determine whether the user's eyes meet conditions which indicates that the user has the detection requirement for the traffic sign, includes: recognizing a contour of the user's eyes through an eye-tracking device; and determining that the user has the detection requirement for the traffic sign when recognizing that the user's eyes open or squint.

In one embodiment, the determining geographic location information of a to-be-detected traffic sign, includes: determining the geographic location information of the traffic sign according to geographic location information of a vehicle and a binocular camera mounted on the vehicle.

In one embodiment, the method further includes: sending the geographic location information of the traffic sign and the sign information to a remote server; and storing, at the remote server, the geographic location information of the traffic sign and the sign information.

According to a second aspect, one embodiment of the present disclosure provides a traffic sign detection method. The traffic sign detection method includes: receiving a request message for requesting for obtaining sign formation of a traffic sign, wherein the request message includes geographic location information of the traffic sign; obtaining the sign formation of the traffic sign corresponding to the geographic location information according to the geographic location information of the traffic sign; and sending the sign formation of the traffic sign.

In one embodiment, the obtaining the sign formation of the traffic sign corresponding to the geographic location information according to the geographic location information of the traffic sign, includes: determining whether a condition for obtaining sign information of the traffic sign is satisfied, according to the geographic location information of the traffic sign; and obtaining the sign formation of the traffic sign corresponding to the geographic location information when determining that the condition for obtaining sign information of the traffic sign is satisfied.

In one embodiment, the determining whether a condition for obtaining sign information of the traffic sign is satisfied, according to the geographic location information of the traffic sign, includes: determining current geographic location information; and determining that the condition for obtaining sign information of the traffic sign is satisfied, when a distance between a position indicated by the current geographic location information and a position indicated by the geographic location information of the traffic sign is less than a preset distance threshold.

In one embodiment, the method further includes: sending an acknowledgement message when determining that the condition for obtaining sign information of the traffic sign is satisfied; and sending a rejection message when determining that the condition for obtaining sign information of the traffic sign is not satisfied.

In one embodiment, the obtaining the sign formation of the traffic sign corresponding to the geographic location information according to the geographic location information of the traffic sign, includes: obtaining the sign formation of the traffic sign corresponding to the geographic location information from pre-stored geographical location information and sign information of traffic signs, according to the geographic location information of the traffic sign.

According to a third aspect, one embodiment of the present disclosure provides a traffic sign detection method. The traffic sign detection method includes: determining, by a first device, geographic location information of a to-be-detected traffic sign; sending, by the first device, a request message for requesting for obtaining sign formation of the traffic sign, wherein the request message includes the geographic location information; receiving, by a second device, the request message, obtaining the sign formation of the traffic sign corresponding to the geographic location information according to the geographic location information, and sending the sign formation of the traffic sign; and receiving, by the first device, the sign formation of the traffic sign.

According to a fourth aspect, one embodiment of the present disclosure provides a traffic sign detection apparatus. The traffic sign detection apparatus includes: an image acquisition device, an eye-tracking device, a communication circuit and a processing circuit. The processing circuit is coupled with the image acquisition device and the eye-tracking device; the processing circuit is configured to determine geographic location information of a to-be-detected traffic sign according to data obtained from the image acquisition device and the eye-tracking device. The communication circuit is coupled with the processing circuit; the communication circuit is configured to send a request message for requesting for obtaining sign formation of the traffic sign, and the request message includes the geographic location information of the traffic sign. The communication circuit is further used to receive the sign formation of the traffic sign corresponding to the geographic location information.

According to a fifth aspect, one embodiment of the present disclosure provides a traffic sign detection apparatus. The traffic sign detection apparatus includes: a processing circuit and a communication circuit. The communication circuit is configured to receive a request message for requesting for obtaining sign formation of a traffic sign; the request message includes geographic location information of the traffic sign; and the communication circuit is further configured to send the sign formation of the traffic sign. The processing circuit is configured to obtain the sign formation of the traffic sign corresponding to the geographic location information according to the geographic location information of the traffic sign.

According to a sixth aspect, one embodiment of the present disclosure provides a traffic sign detection system. The traffic sign detection system includes: a first device and a second device. The first device is configured to determine geographic location information of a to-be-detected traffic sign; send a request message for requesting for obtaining sign formation of the traffic sign, wherein the request message includes the geographic location information; and receive the sign formation of the traffic sign. The second device is configured to receive the request message, obtain the sign formation of the traffic sign corresponding to the geographic location information according to the geographic location information, and send the sign formation of the traffic sign.

According to a seventh aspect, one embodiment of the present disclosure provides a computing device. The computing device includes: one or more processors; and a storage device configured to store one or more programs. The one or more programs are executed by the one or more processors to enable the one or more processors to implement the above traffic sign detection method.

According to an eighth aspect, one embodiment of the present disclosure provides a computer readable storage medium storing a computer program. The computer program is executed by a processor to enable the processor to implement the above traffic sign detection method.

The present summary is provided only by way of example, and not limitation. Other aspects of the present disclosure will be appreciated in view of the entirety of the present disclosure, including the entire text, claims, and accompanying figures.

Figure 1:
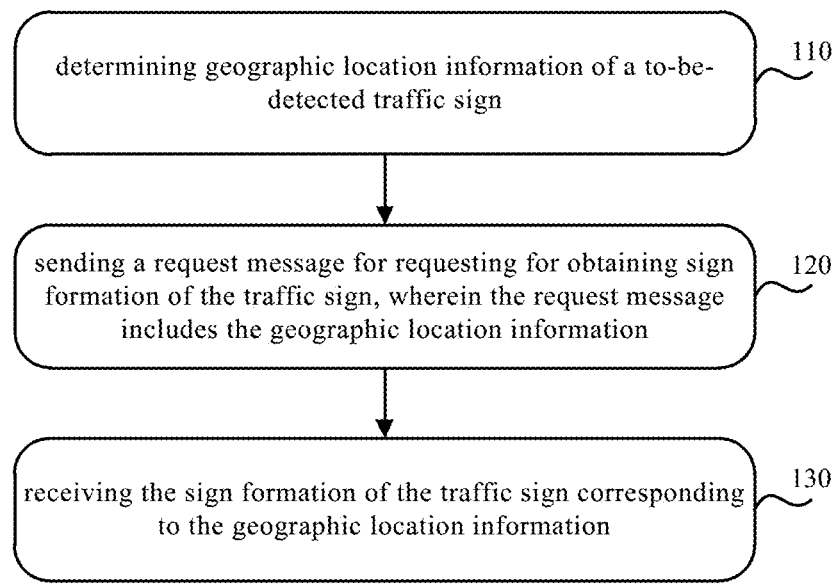
FIG. 1 is a flow chart of a traffic sign detection method according to an embodiment of the present disclosure.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The following description of exemplary embodiments is merely used to illustrate the present disclosure and is not to be construed as limiting the present disclosure.

FIG. 1 is a flow chart of a traffic sign detection method according to an embodiment of the present disclosure. As shown in FIG. 1, the traffic sign detection method may be implemented by an in-vehicle device of a vehicle. The traffic sign detection method includes the following steps 110-130.

The step 110 is to determine geographic location information of a to-be-detected traffic sign.

Specifically, geographic location information of a vehicle may first be determined through a positioning system of the vehicle; then, three-dimensional coordinates of the traffic sign can be determined through a binocular camera mounted on the vehicle; and then the geographic location information of the traffic sign can be determined according to the three-dimensional coordinates of the traffic sign as well as the geographic location information of the vehicle.

In one embodiment, the geographic location information may refer to global positioning system (GPS) coordinates.

In addition, when determining geographic location information of the to-be-detected traffic sign, whether one user has a detection requirement for the traffic sign is first determined according to the user's sight. The detection requirement means that the user wants to see the traffic sign ahead. When it is determined that the user has a detection requirement for the traffic sign, then the geographic location information of the traffic sign is determined.

In one embodiment, determining whether one user has a detection requirement for the traffic sign may be implemented as follows First, first position information of the traffic sign in a coordinate system with the user's eye as an origin, and second position information of an intersection point between the user's sight and a front windshield glass of the vehicle in the coordinate system with the user's eye as the origin, are determined.

The coordinate system with the user's eye as the origin refers to a three-axis coordinate system with the user's eye as the origin, where the three axes include an X axis, a Y axis and a Z axis. When the user sits in a driving position of the vehicle, an axis line that is parallel with the user's front and rear direction may be regarded as the X axis; an axis line that is parallel with the user's left and right direction may be regarded as the Y axis; and an axis line that is parallel with the user's up and down direction may be regarded as the Z axis.

Then, when the first position information and the second position information satisfy a preset relationship, it is determined that the user has the detection requirement for the traffic sign.

When the user is currently watching the traffic sign, the user's eyes, the intersection point between the user's sight and the front windshield glass of the vehicle, and the traffic sign are inevitably on the same line. There is a certain proportional relationship among positions of the user's eyes, the intersection point between the user's sight and the front windshield glass of the vehicle and the traffic sign. Thus, when the first position information and the second position information satisfy the preset relationship, i.e., a position of the traffic sign indicted by the first position information, a position of the intersection point between the user's sight and the front windshield glass of the vehicle indicted by the second position information, and a position of the user's eyes are on the same straight line, it means that the user is watching the traffic sign, i.e., the user has the detection requirement for the traffic sign.

One process of determining the first position information and the second position information is described hereinafter.

Figure 2:
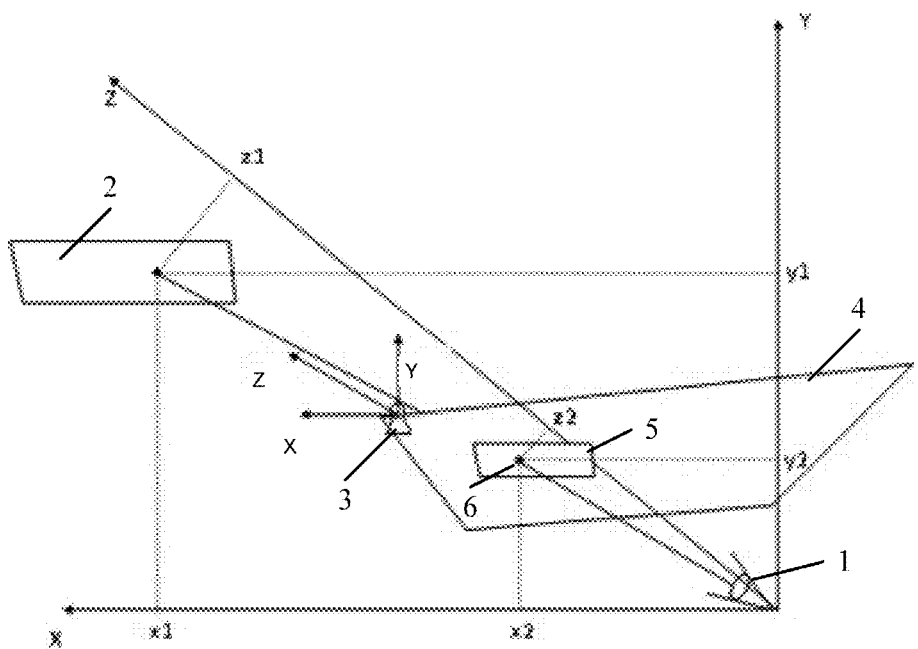
FIG. 2 is a schematic view showing first position information and second position information according to an embodiment of the present disclosure.

FIG. 2 is a schematic view showing first position information and second position information according to an embodiment of the present disclosure. In FIG. 2, the reference number 1 represents the user's eye; the reference number 2 represents the traffic sign in front of the vehicle; the reference number 3 represents an eye-tracking device mounted on the vehicle; the reference number 4 represents the front windshield glass of the vehicle; the reference number 5 represents an image of the traffic sign in front of the vehicle in the front windshield glass; and the reference number 6 represents the intersection point between the user's sight and the front windshield glass of the vehicle.

The first position information may be determined in the following process.

First, first position coordinates of the traffic sign in front of the vehicle in a coordinate system with the binocular camera as the origin, are determined through the binocular camera mounted on the vehicle, where the binocular camera may be mounted at a proper position of the vehicle as long as the binocular camera is oriented towards the front of the vehicle.

Referring to FIG. 2, the coordinate system with the binocular camera as the origin refers to a three-axis coordinate system with the binocular camera as the origin, where the three axes include an X' axis, a Y' axis and a Z' axis. An axis line that is parallel with a front and rear direction of the binocular camera may be regarded as the X' axis. An axis line that is parallel with a left and right direction of the binocular camera may be regarded as the Y' axis. An axis line that is parallel with an up and down direction of the binocular camera may be regarded as the Z' axis.

Then, second position coordinates of the user's eyes in a coordinate system with the eye-tracking device as the origin, are determined through the eye-tracking device mounted on the vehicle, where the eye-tracking device may be mounted at a proper position of the vehicle as long as the eye-tracking device is oriented towards the driver.

After that, according to the second position coordinates and a position relationship between the binocular camera and the eye-tracking device, the first position coordinates are converted into third position coordinates in the coordinate system with the user's eye as the origin.

Specifically, according to the second position coordinates and the position relationship between the binocular camera and the eye-tracking device, coordinates of the binocular camera in the coordinate system with the user's eye as the origin can be determined; then, the first position coordinates can be converted into the third position coordinates in the coordinate system with the user's eye as the origin. For example, the coordinates of the binocular camera in the coordinate system with the user's eye as the origin can be determined as (x0, y0, z0), the first position coordinates are (x, y, z), then the third position coordinates after conversion are (x±x0, y±y0, z±z0).

Finally, the third position coordinates are determined as the first position information of the traffic sign.

Referring to FIG. 2, the first position information is (x1, y1, z1).

The second position information may be determined in the following process.

First, the user's sight is calibrated with the eye-tracking device mounted on the vehicle to determine focus points of the user's eyes when the user views different positions.

Then, according to the focus points of the user's eyes when the user views different positions, fourth position coordinates of the intersection point between the user's sight and the front windshield glass of the vehicle in the coordinate system with the user's eye as the origin, are determined.

Specifically, when the user's eye views different positions, the user's sight may be determined by letting the user view a fixed marker. For example, when the user's eye views a point A of the fixed marker, then the user's sight when the user's eye views the point A of the fixed marker may be determined by the eye-tracking device; after that, when the user's eye views a point B of the fixed marker, then the user's sight when the user's eye views the point B of the fixed marker may be determined by the eye-tracking device. More points of the fixed marker may be used to determine the user's sight when the user's eye views different points of the fixed marker. The more points, the smaller the error in subsequent determination of the focus points is. When the user's eye views other regions, focus points of the user's eyes when the user views other regions can be calculated according to the user's sight when the user's eye views different points of the fixed marker.

The fixed marker may be a display screen in the vehicle or a pattern at the front windshield glass, as long as it is disposed at a fixed position. When the fixed marker is disposed at one fixed position, coordinates of the fixed marker in the coordinate system with the eye-tracking device as the origin are known.

Finally, the fourth position coordinates are determined as the second position information of the intersection point.

When the user is currently watching the traffic sign, the user's eyes, the intersection point between the user's sight and the front windshield glass of the vehicle, and the traffic sign are inevitably on the same line, and their coordinates are in the same coordinate system, thus, when the first position information and the second position information satisfy the preset relationship, i.e., x2/x1=y2/y1=z2/z1, it means that the user is currently watching the traffic sign and the user has the detection requirement for the traffic sign.

Further, in order to avoid false identification (i.e., the user's eyes look in a direction of the traffic sign, but actually, the user does not have the detection requirement for the traffic sign), the method of one embodiment of the present disclosure further includes: when the first position information and the second position information satisfy the preset relationship, continuing to determine whether the user's eyes meet conditions which indicates that the user has the detection requirement for the traffic sign. For example, when the user watches the traffic sign, the user's eyes open or squint.

When determining that the user's eyes meet conditions which indicates that the user has the detection requirement for the traffic sign, it is determined that the user has the detection requirement for the traffic sign.

For example, a contour of the user's eyes may be recognized through the eye-tracking device; when it is recognized that the user's eyes open or squint, it means that the user has the detection requirement for the traffic sign.

The step 120 is to send a request message for requesting for obtaining sign formation of the traffic sign. The request message includes the geographic location information of the traffic sign.

In one embodiment of the present disclosure, the sign formation of the traffic sign may be a traffic sign image.

In addition, when sending the request message, the request message may be sent to a remote server or an in-vehicle device of other vehicles located within a designated range of the vehicle.

When the request message is sent to one in-vehicle device of other vehicle located within the designated range of the vehicle, the request message may be sent via wireless fidelity (WI-FI) or Bluetooth.

When the request message is sent to the remote server, the in-vehicle device of the vehicle has wireless network communication conditions.

The step 130 is to receive the sign formation of the traffic sign corresponding to the geographic location information.

After the sign formation is received, the traffic sign may be displayed for the user.

Specifically, the traffic sign may be displayed at a display device (such as a central control panel, a smart rearview mirror, or a sunshade display panel) in the vehicle. Alternatively, after the sign formation is received, a text message that represents the traffic sign information may be displayed at the display device or broadcasted to users by voice.

Optionally, after the sign formation is received, the method of one embodiment of the present disclosure may further include: sending the geographic location information of the traffic sign and the sign information to the remote server, and storing, by the remote server, the geographic location information of the traffic sign and the sign information.

In addition, when each vehicle passes by a traffic sign board, each vehicle may use its own camera recognition system to recognize the sign information of the traffic sign and store the recognized sign information of the traffic sign into a storage medium of the camera recognition system. Meanwhile, GPS information at this point may be stored together with the recognized sign information of the traffic sign.

In situations with network communication conditions (i.e., wireless 4G signal and other scenarios), the sign information of the traffic sign and the GPS information are uploaded to the remote server.

Figure 3:
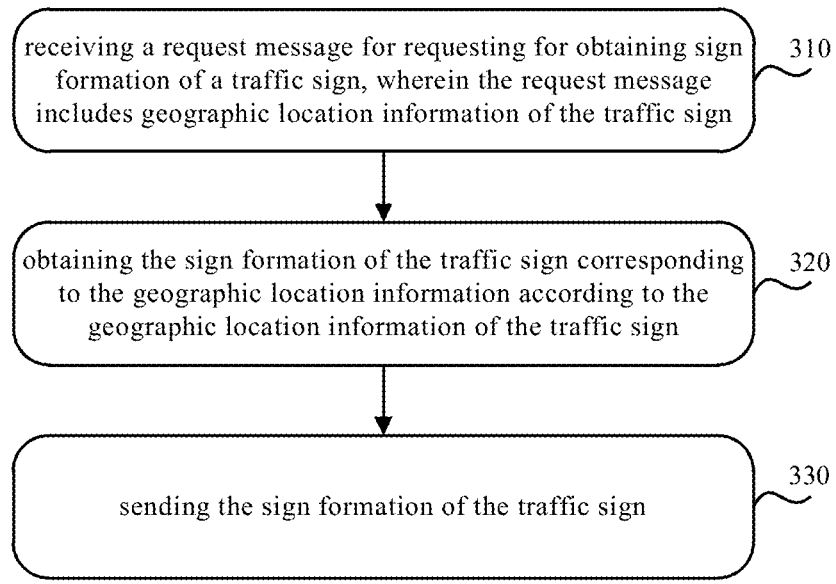
FIG. 3 is a flow chart of a traffic sign detection method according to an embodiment of the present disclosure.

FIG. 3 is a flow chart of a traffic sign detection method according to an embodiment of the present disclosure. As shown in FIG. 3, the traffic sign detection method may be implemented by a remote server or an in-vehicle device of a vehicle. The traffic sign detection method includes the following steps 310-330.

The step 310 is to receive a request message for requesting for obtaining sign formation of a traffic sign. The request message includes geographic location information of the traffic sign.

The step 320 is to obtain the sign formation of the traffic sign corresponding to the geographic location information according to the geographic location information of the traffic sign.

The step 330 is to send the sign formation of the traffic sign.

When the step 320 is performed by the remote server, based on the geographic location information of the traffic sign, the sign formation of the traffic sign corresponding to the geographic location information may be obtained from pre-stored geographical location information and sign information of traffic signs.

When the step 320 is performed by the in-vehicle device, based on the geographic location information of the traffic sign, it is first determined whether a condition for obtaining sign information of the traffic sign is satisfied; when determining that the condition for obtaining sign information of the traffic sign is satisfied, the sign formation of the traffic sign corresponding to the geographic location information can be obtained.

Specifically, the GPS positioning system of the vehicle first determines the current geographic location information such as GPS coordinates; when a distance between a position indicated by the current geographic location information and a position indicated by the geographic location information of the traffic sign is less than a preset distance threshold (i.e., 200 meters, which may be set by the user), it is determined that the condition for obtaining sign information of the traffic sign is satisfied.

Further, the method of one embodiment of the present disclosure may further includes: sending an acknowledgement message when determining that the condition for obtaining sign information of the traffic sign is satisfied; and sending a rejection message when determining that the condition for obtaining sign information of the traffic sign is not satisfied.

Figure 4:
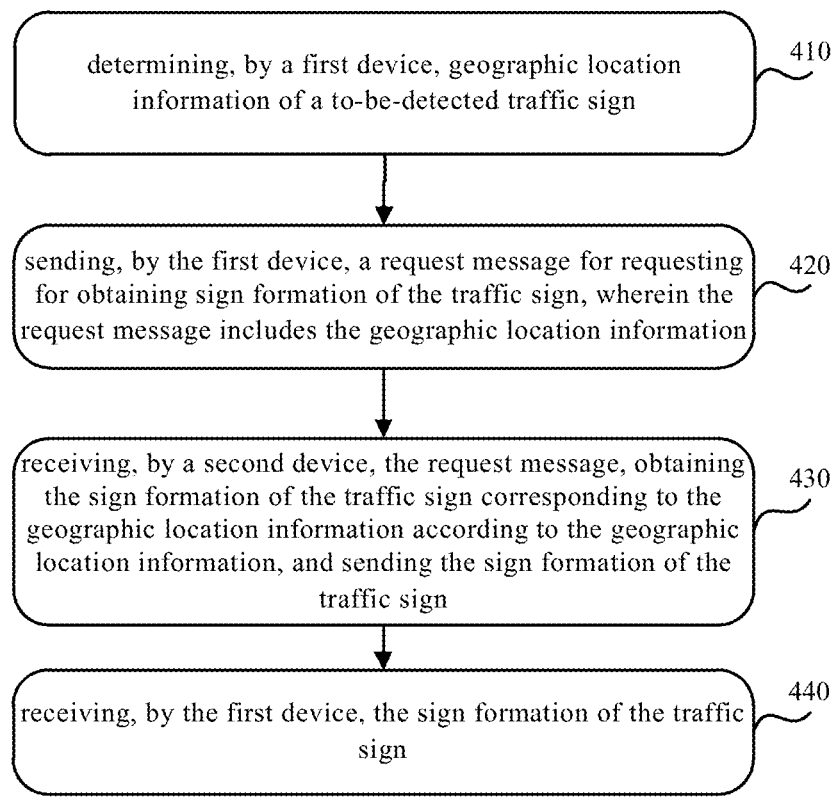
FIG. 4 is a flow chart of another traffic sign detection method according to an embodiment of the present disclosure.

FIG. 4 is a flow chart of another traffic sign detection method according to an embodiment of the present disclosure. This method involves an interaction process between a remote server and an in-vehicle device of a vehicle, or between in-vehicle devices of vehicles. The method includes the following steps 410 to 440.

At the step 410, a first device determines geographic location information of a to-be-detected traffic sign.

At the step 420, the first device sends a request message for requesting for obtaining sign formation of the traffic sign, where the request message includes the geographic location information.

At the step 430, a second device receives the request message, obtains the sign formation of the traffic sign corresponding to the geographic location information according to the geographic location information, and sends the sign formation of the traffic sign.

At the step 440, the first device receives the sign formation of the traffic sign.

The first device is an in-vehicle device of one vehicle, and the second device is a remote server or an in-vehicle device of another vehicle. Specific implementation process has been described in the above embodiment and will not be elaborated herein.

In the above traffic sign detection solution of some embodiments of the present disclosure, after the geographic location information of the to-be-detected traffic sign is determined, the request message containing the geographic location information and used for requesting for obtaining sign formation of the traffic sign is sent out, and then the sign formation of the traffic sign corresponding to the geographic location information is received. This allows the user to see the traffic sign more clearly, thereby improving traffic safety.

The present disclosure will be described hereinafter in details in conjunction with examples. However, the present disclosure is not limited to the following examples.

Figure 5:
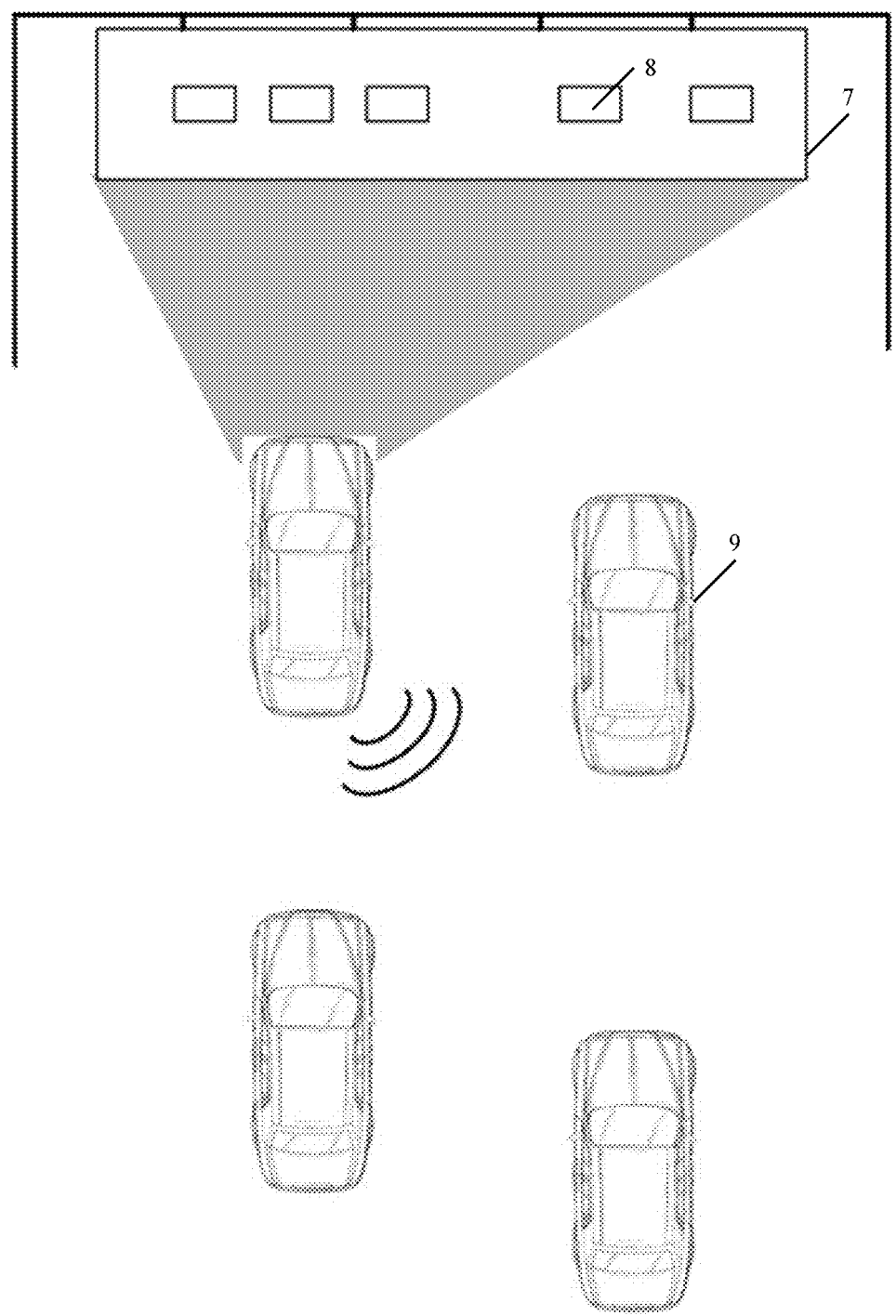
FIG. 5 is a schematic view of an application scenario for the traffic sign detection method according to an embodiment of the present disclosure.

FIG. 5 is a schematic view of an application scenario for the traffic sign detection method according to an embodiment of the present disclosure. In FIG. 5, the reference number 7 represents a traffic sign board; the reference number 8 represents a traffic sign; the reference number 9 represents a vehicle on the road. When a traffic sign appears in front of the vehicle that is moving on the road, the in-vehicle device of the vehicle can determine geographic location information of the traffic sign, and send a request message including the geographic location information to a remote server or other vehicle around the vehicle, thereby obtaining sign information of the traffic sign.

Figure 6:
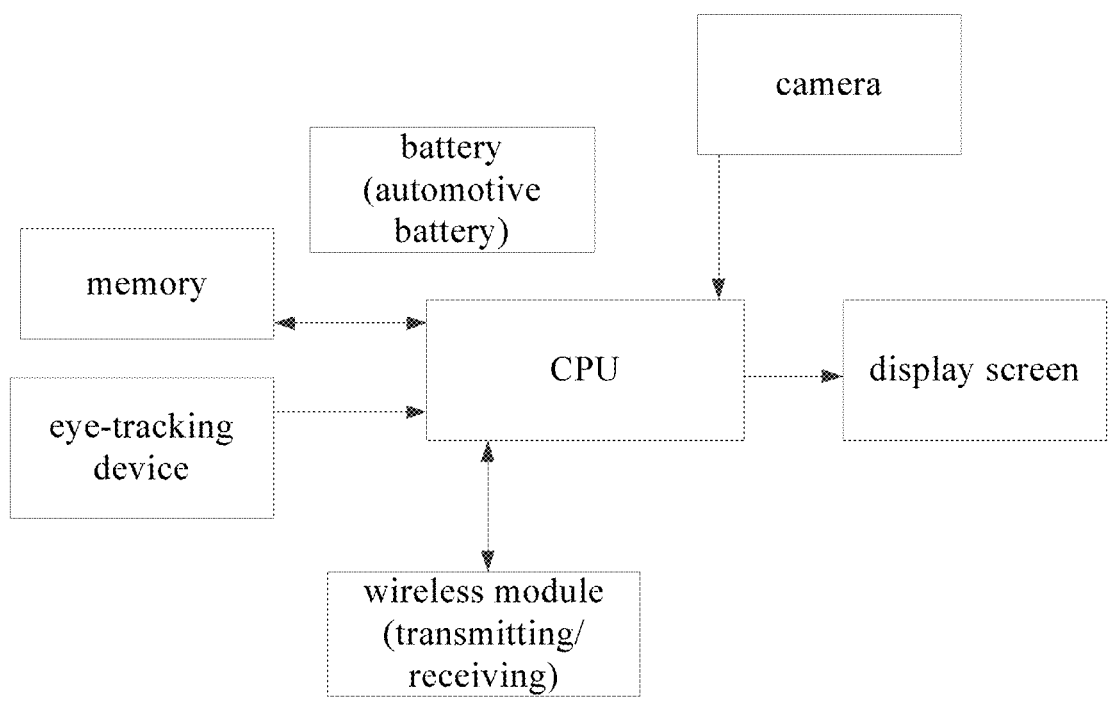
FIG. 6 is a block diagram of an electronic system for an in-vehicle device according to an embodiment of the present disclosure.

FIG. 6 is a block diagram of an electronic system for an in-vehicle device according to an embodiment of the present disclosure. In the electronic system shown in FIG. 6, a battery is used to supply power for the entire electronic system; a camera (i.e., binocular camera) is used to collect sign information of a traffic sign, and the collected sign information of the traffic sign is processed by a CPU and then is stored in a memory. The binocular camera and an eye-tracking device are used to determine whether a user has a detection requirement for the traffic sign. When it is determined that the user has a detection requirement for the traffic sign, the CPU controls a wireless module for transmitting/receiving (i.e., a module with wireless network communication function such as wifi or bluetooth) to send the request message to a remote server or an in-vehicle device of a front vehicle. The remote server or the in-vehicle device of the front vehicle replies to the request message and then sends the sign information of the traffic sign to the vehicle which sends the request message. Then, the corresponding identification information is stored in the local memory by the CPU, and the CPU finally controls a display screen to display an image to show the sign information.

Based on the above electronic system of the in-vehicle device, the traffic sign detection method of one embodiment of the present disclosure may be implemented in two ways, i.e., implemented between in-vehicle devices or between one in-vehicle device and the remote server. Each of the two ways includes two threads including a request thread and a response thread.

The request thread and the response thread will be described hereinafter by taking in-vehicle device-in-vehicle device as an example.

Figure 7:
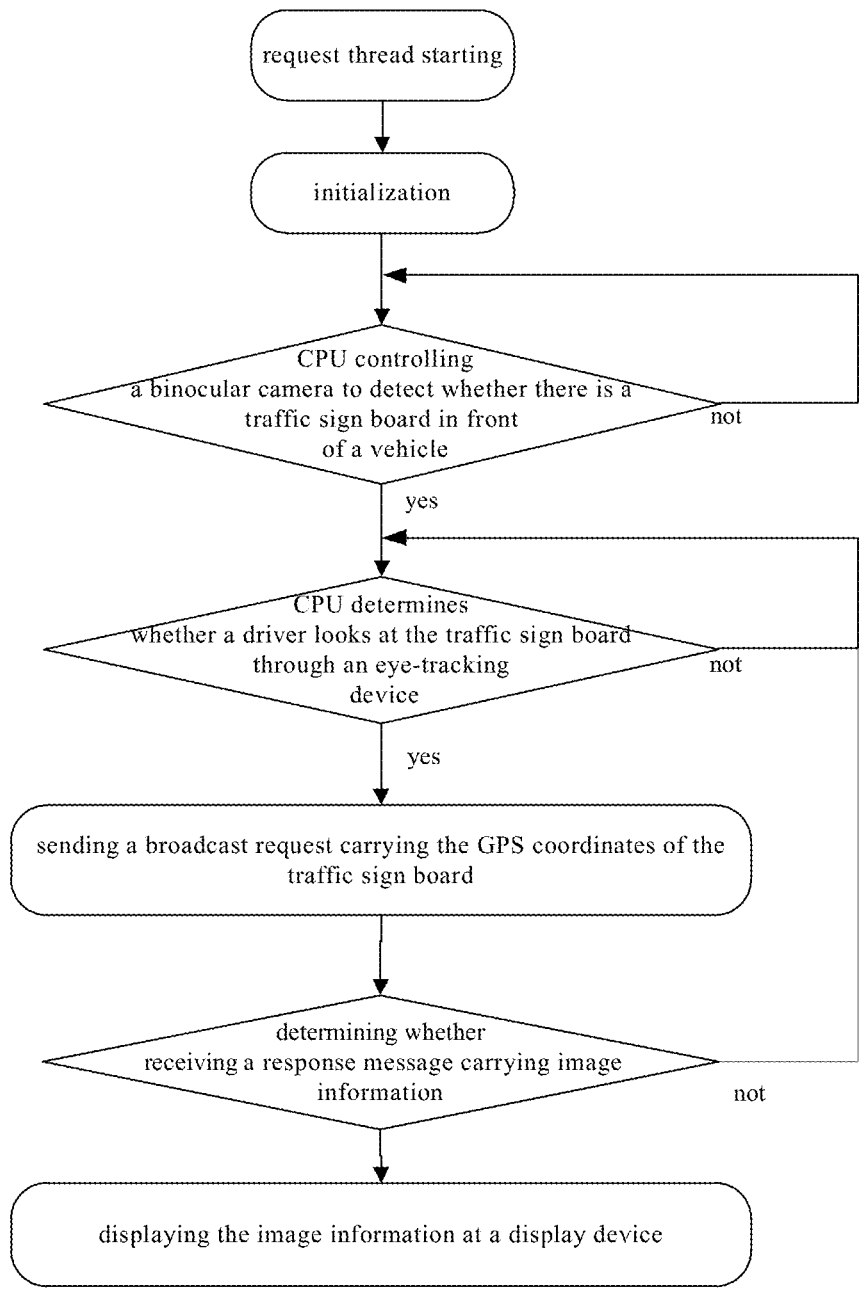
FIG. 7 is a flow chart of a request thread according to an embodiment of the present disclosure.

FIG. 7 is a flow chart of a request thread according to an embodiment of the present disclosure. When the vehicle moves, the CPU controls the binocular camera to detect whether there is a traffic sign board in front of the vehicle. When detecting that there is a traffic sign board in front of the vehicle, GPS coordinates of the traffic sign board is determined. Then, the CPU determines whether the driver looks at the traffic sign board through the eye-tracking device. When determining that the driver looks at the traffic sign board, a broadcast request carrying the GPS coordinates of the traffic sign board is sent out. When receiving a response message, sign information carried in the response message is displayed at the display device.

Figure 8:
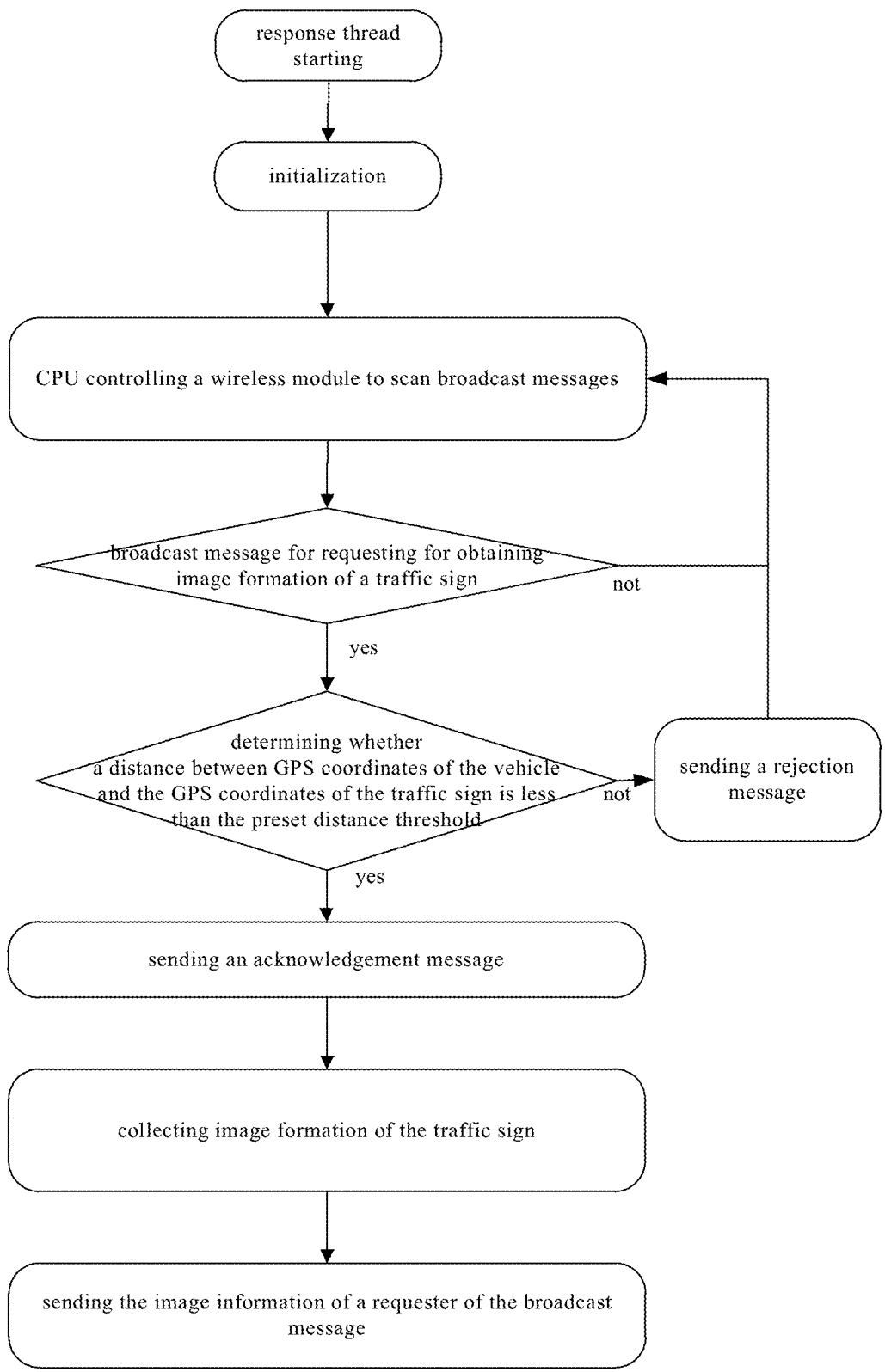
FIG. 8 is a flow chart of a response thread according to an embodiment of the present disclosure.

FIG. 8 is a flow chart of a response thread according to an embodiment of the present disclosure. When the vehicle moves, the CPU controls the wireless module to scan broadcast messages. When a scanned broadcast message is a message for requesting for obtaining sign formation of a traffic sign, it is first to determine whether a distance between GPS coordinates of the vehicle and the GPS coordinates of the traffic sign is less than the preset distance threshold (i.e., 200 meters). When the distance between the GPS coordinates of the vehicle and the GPS coordinates of the traffic sign is less than the preset distance threshold, an acknowledgement message is sent out. Then, the binocular camera captures an image according to the GPS coordinates of the traffic sign, and sign information of a traffic sign in the image is extracted through the image recognition technology and then is sent to a requester. When the distance between GPS coordinates of the vehicle and the GPS coordinates of the traffic sign is not less than the preset distance threshold, a rejection message is sent out.

It should be noted that although operations of the method of the present disclosure are described in a particular order in the drawings, this does not require or imply that these operations must be performed in that particular order or that all the operations must be performed in order to achieve the desired results. On the contrary, the steps described in the flowchart may change the order of execution. Additionally or alternatively, certain steps may be omitted, multiple steps may be merged into one step for execution, and/or a step may be decomposed into multiple steps for execution.

Figure 9:
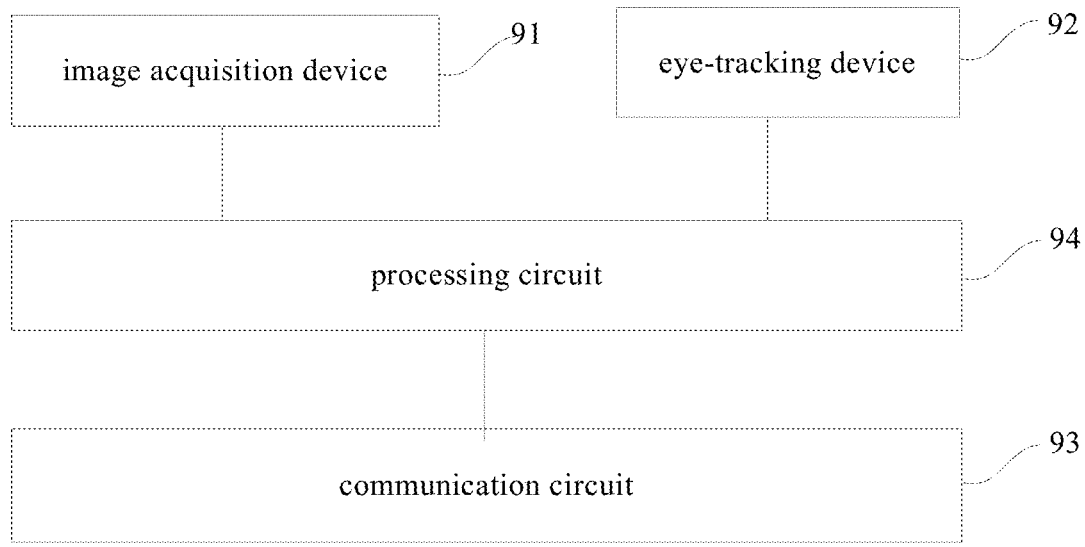
FIG. 9 is a block diagram of a traffic sign detection apparatus according to an embodiment of the present disclosure.

Further referring to FIG. 9, FIG. 9 is a block diagram of a traffic sign detection apparatus according to an embodiment of the present disclosure. The traffic sign detection apparatus includes an image acquisition device 91, an eye-tracking device 92, a communication circuit 93 and a processing circuit 94.

The processing circuit 94 is coupled with the image acquisition device 91 and the eye-tracking device 92. The processing circuit 94 is used to determine geographic location information of a to-be-detected traffic sign according to data obtained from the image acquisition device 91 and the eye-tracking device 92.

The communication circuit 93 is coupled with the processing circuit 94. The communication circuit 93 is used to send a request message for requesting for obtaining sign formation of the traffic sign. The request message includes the geographic location information of the traffic sign. The communication circuit 93 is further used to receive the sign formation of the traffic sign corresponding to the geographic location information.

Optionally, the processing circuit 94 is used to: determine whether one user has a detection requirement for the traffic sign according to the user's sight; and determine the geographic location information of the traffic sign when it is determined that the user has a detection requirement for the traffic sign.

Further, when the processing circuit 94 determines whether one user has a detection requirement for the traffic sign according to the user's sight, the processing circuit 94 is used to: determine first position information of the traffic sign in a coordinate system with the user's eye as an origin; determine second position information of an intersection point between the user's sight and a front windshield glass of the vehicle in the coordinate system with the user's eye as the origin; and determining that the user has the detection requirement for the traffic sign when the first position information and the second position information satisfy a preset relationship.

Further, when the processing circuit 94 determines the first position information of the traffic sign in the coordinate system with the user's eye as the origin, the processing circuit 94 is used to: determine first position coordinates of the traffic sign in a coordinate system with the binocular camera as the origin, through the binocular camera mounted on the vehicle; determine second position coordinates of the user's eyes in a coordinate system with the eye-tracking device as the origin, through the eye-tracking device mounted on the vehicle; according to the second position coordinates and a position relationship between the binocular camera and the eye-tracking device, converting the first position coordinates into third position coordinates in the coordinate system with the user's eye as the origin; and determine the third position coordinates as the first position information of the traffic sign.

Further, when the processing circuit 94 determines the second position information of the intersection point between the user's sight and the front windshield glass of the vehicle in the coordinate system with the user's eye as the origin, the processing circuit 94 is used to: calibrate the user's sight with the eye-tracking device mounted on the vehicle to determine focus points of the user's eyes when the user views different positions; according to the focus points of the user's eyes when the user views different positions, determine fourth position coordinates of the intersection point between the user's sight and the front windshield glass of the vehicle in the coordinate system with the user's eye as the origin; and determine the fourth position coordinates as the second position information of the intersection point.

Further, when the processing circuit 94 determines that the user has a detection requirement for the traffic sign when the first position information and the second position information satisfy the preset relationship, the processing circuit 94 is used to: when the first position information and the second position information satisfy the preset relationship, continue to determine whether the user's eyes meet conditions which indicates that the user has the detection requirement for the traffic sign; when determining that the user's eyes meet conditions which indicates that the user has the detection requirement for the traffic sign, determine that the user has the detection requirement for the traffic sign.

Optionally, the processing circuit 94 is further used to determine the geographic location information of the traffic sign according to the geographic location information of the vehicle and the binocular camera mounted on the vehicle.

Optionally, the communication circuit 93 is further used to send the geographic location information of the traffic sign and the sign information to the remote server. The remote server stores the geographic location information of the traffic sign and the sign information.

It should be understood that units or modules described in the apparatus correspond to the various steps in the method described with reference to FIG. 1. Thus, the operations and features described above for the method are also applicable to the apparatus and the units contained therein, and are not described herein again.

Figure 10:
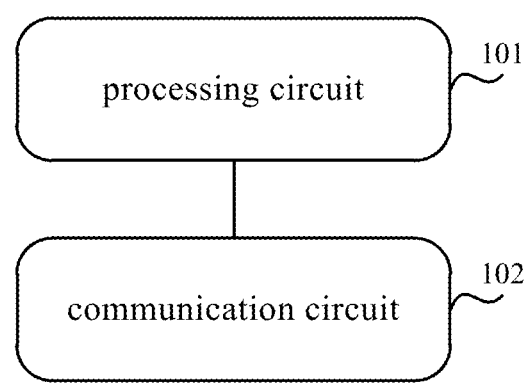
FIG. 10 is a block diagram of a traffic sign detection apparatus according to an embodiment of the present disclosure.

Further referring to FIG. 10, FIG. 10 is a block diagram of a traffic sign detection apparatus according to an embodiment of the present disclosure. The traffic sign detection apparatus includes a processing circuit 101 and a communication circuit 102.

The communication circuit 102 is used to receive a request message for requesting for obtaining sign formation of a traffic sign. The request message includes geographic location information of the traffic sign. The communication circuit 102 is further used to send the sign formation of the traffic sign.

The processing circuit 101 is used to obtain the sign formation of the traffic sign corresponding to the geographic location information according to the geographic location information of the traffic sign.

Optionally, the processing circuit 101 is further used to, based on the geographic location information of the traffic sign, determine whether a condition for obtaining sign information of the traffic sign is satisfied; when determining that the condition for obtaining sign information of the traffic sign is satisfied, obtain the sign formation of the traffic sign corresponding to the geographic location information.

Further, when the processing circuit 101 is used to, based on the geographic location information of the traffic sign, determine whether a condition for obtaining sign information of the traffic sign is satisfied, the processing circuit 101 is further used to: determine current geographic location information; and when a distance between a position indicated by the current geographic location information and a position indicated by the geographic location information of the traffic sign is less than a preset distance threshold, determine that the condition for obtaining sign information of the traffic sign is satisfied.

Further, the communication circuit 102 is further used to: send an acknowledgement message when the processing circuit 101 determines that the condition for obtaining sign information of the traffic sign is satisfied; and send a rejection message when the processing circuit 101 determines that the condition for obtaining sign information of the traffic sign is not satisfied.

Optionally, the processing circuit 101 is further used to, based on the geographic location information of the traffic sign, obtain the sign formation of the traffic sign corresponding to the geographic location information from pre-stored geographical location information and sign information of traffic signs.

It should be understood that units or modules described in the apparatus correspond to the various steps in the method described with reference to FIG. 3. Thus, the operations and features described above for the method are also applicable to the apparatus and the units contained therein, and are not described herein again.

Figure 11:
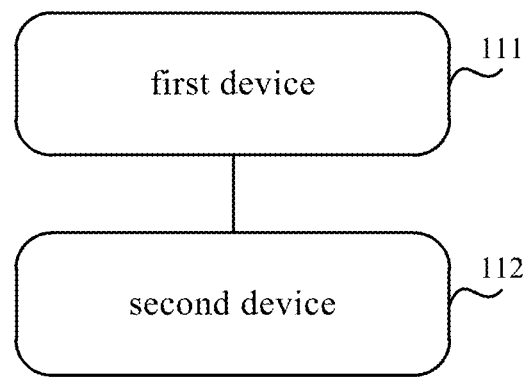
FIG. 11 is a block diagram of a traffic sign detection system according to an embodiment of the present disclosure.

FIG. 11 is a block diagram of a traffic sign detection system according to an embodiment of the present disclosure. Referring to FIG. 11, the system includes a first device 111 and a second device 112.

The first device 111 is used to determine geographic location information of a to-be-detected traffic sign; send a request message for requesting for obtaining sign formation of the traffic sign, where the request message includes the geographic location information; and receive the sign formation of the traffic sign.

The second device is used to receive the request message, obtain the sign formation of the traffic sign corresponding to the geographic location information according to the geographic location information, and send the sign formation of the traffic sign.

It should be understood that units or modules described in the apparatus correspond to the various steps in the method described with reference to FIG. 4. Thus, the operations and features described above for the method are also applicable to the apparatus and the units contained therein, and are not described herein again.

As another aspect, one embodiment of the present disclosure further provides a computing device. The computing device includes one or more processors, and a storage device for storing one or more programs. When one or more programs are executed by one or more processors, one or more processors is enabled to implement any one of the above methods.

Figure 12:
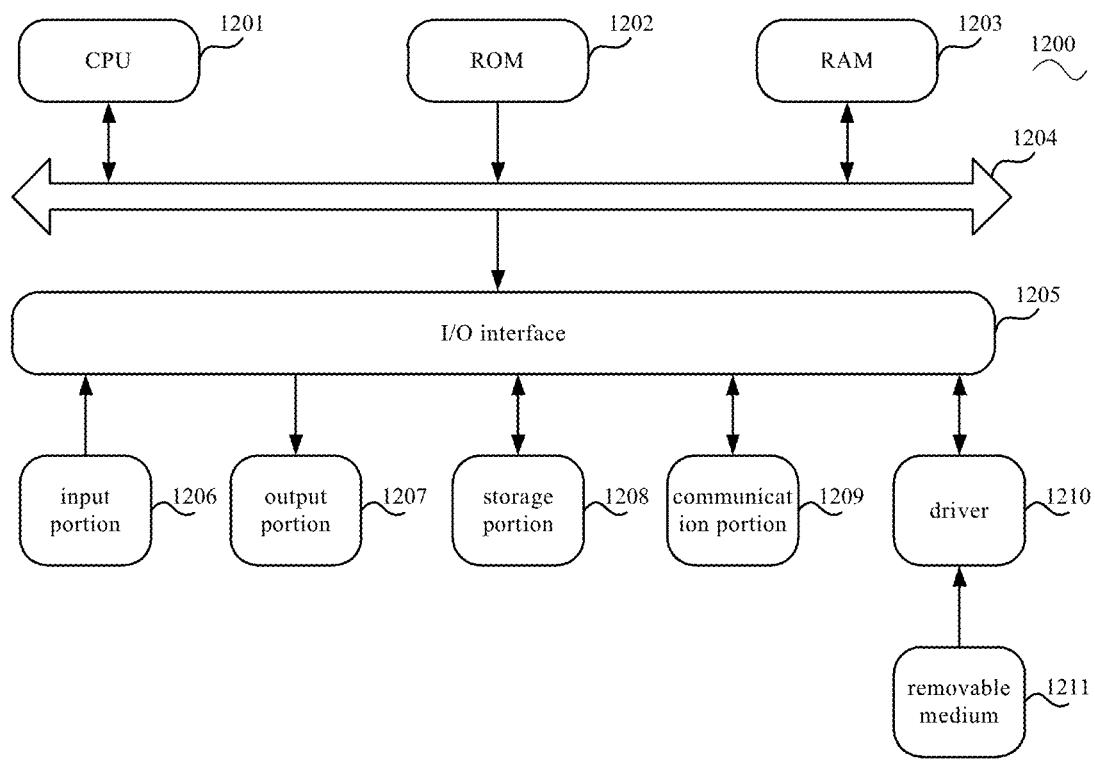
FIG. 12 is a schematic block diagram of a computer system suitable for implementing a terminal device or a server of an embodiment of the present disclosure.

FIG. 12 is a schematic block diagram of a computer system suitable for implementing a terminal device or a server of an embodiment of the present disclosure.

As shown in FIG. 12, the computer system 1200 includes a central processing unit (CPU) 1201 that can perform various appropriate operations and processing in accordance with a program stored in a read only memory (ROM) 1202 or a program loaded from a storage portion 1208 into a random access memory (RAM) 1203. In the RAM 1203, various programs and data required for operations of the system 1200 are also stored. The CPU 1201, the ROM 1202 and the RAM 1203 are connected to each other through a bus 1204. An input/output (I/O) interface 1205 is also coupled to the bus 1204.

The following components are coupled to the I/O interface 1205: an input portion 1206 including a keyboard, a mouse, etc.; an output portion 1207 including a cathode ray tube (CRT), a liquid crystal display (LCD), a speaker, etc.; the storage portion 1208 including a hard disk, etc.; and a communication portion 1209 including a network interface card such as a LAN card, a modem, etc. The communication portion 1209 performs communication processing via a network such as the internet. A driver 1210 is also coupled to the I/O interface 1205 according to needs. A removable medium 1211, such as a magnetic disk, an optical disk, a magneto-optical disk, a semiconductor memory, is mounted on the driver 1210 according to needs so that a computer program read therefrom is installed into the storage portion according to needs.

In particular, in accordance with embodiments of the present disclosure, the processes described above with reference to FIGS. 1-8 may be implemented as a computer software program. For example, one embodiment of the present disclosure provides a computer program product including a computer program tangibly contained in a machine readable medium. The computer program includes program code for performing the method described above. In such an embodiment, the computer program may be downloaded and installed from the network via the communication portion 1209, and/or installed from the removable medium 1211.

The flowcharts and block diagrams in the drawings illustrate possible architecture, functions and operations of the system, the method and the computer program product according to various embodiments of the present disclosure. In this regard, each box in the flowchart or the block diagram may represent a module, a program segment or a part of a code. The module, the program segment or the part of the code contains one or more executable instructions for implementing a specified logical function. It should also be noted that in some alternative implementations, the functions labeled in the boxes may also occur in a different order than those labeled in the drawings. For example, two contiguous boxes may actually be executed in essentially parallel, and they may sometimes be executed in reverse order, depending on the functions involved. It should also be noted that each box of the block diagrams and/or the flowcharts, and combinations of boxes in the block diagrams and/or the flowcharts, may be implemented in a dedicated hardware-based system that performs the specified functions or operations, or implemented by a combination of dedicated hardware and computer instructions.

The units or modules described in the embodiments of the present disclosure may be implemented by software or by hardware. The described units or modules may also be provided in the processor, and may be described as that a processor includes an XX unit, a YY unit, and a ZZ unit. Names of these units or modules do not constitute a limitation on the units or the modules themselves in some cases. For example, the XX unit may also be described as "a unit for XX".

In another aspect, one embodiment of the present disclosure further provides a computer readable storage medium, which may be a computer readable storage medium included in the apparatus described in the foregoing embodiments, or a computer readable storage medium that exists separately and is not assembled into a device. The computer readable storage medium stores one or more programs that are executed by one or more processors to perform the methods described in the present disclosure.

The above are merely the preferred embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure.

The invention claimed is:

1. A traffic sign detection method comprising:
   determining geographic location information of a to-be-detected traffic sign;
   sending a request message requesting to obtaining sign formation of the traffic sign, wherein the request message includes the geographic location information; and
   receiving the sign formation of the traffic sign corresponding to the geographic location information;
   wherein determining geographic location information of a to-be-detected traffic sign comprises:
      determining whether a user has a detection requirement for the traffic sign according to the user's sight; and
      determining the geographic location information of the traffic sign when determining that the user has the detection requirement for the traffic sign; and
   wherein determining whether a user has a detection requirement for the traffic sign according to the user's sight comprises:
      determining first position information of the traffic sign in a coordinate system with the user's eye as an origin;
      determining second position information of an intersection point between the user's sight and a front windshield glass of a vehicle in the coordinate system with the user's eye as the origin; and
      determining that the user has the detection requirement for the traffic sign when the first position information and the second position information satisfy a preset relationship.

2. The method of claim 1, wherein determining the first position information of the traffic sign in the coordinate system with the user's eye as an origin comprises:
   determining, by a binocular camera mounted on the vehicle, first position coordinates of the traffic sign in a coordinate system with the binocular camera as the origin;
   determining, by an eye-tracking device mounted on the vehicle, second position coordinates of the user's eyes in a coordinate system with the eye-tracking device as the origin;
   converting the first position coordinates into third position coordinates in the coordinate system with the user's eye as the origin, according to the second position coordinates and a position relationship between the binocular camera and the eye-tracking device; and
   providing the third position coordinates as the first position information of the traffic sign.

3. The method of claim 1, wherein determining the second position information of the intersection point between the user's sight and the front windshield glass of the vehicle in the coordinate system with the user's eye as the origin comprises:
   calibrating the user's sight with an eye-tracking device mounted on the vehicle, thereby determining focus points of the user's eyes when the user views different positions;
   determining fourth position coordinates of the intersection point between the user's sight and the front windshield glass of the vehicle in the coordinate system with the user's eye as the origin, according to the focus points of the user's eyes when the user views different positions; and
   providing the fourth position coordinates as the second position information of the intersection point.

4. The method of claim 1, wherein determining that the user has the detection requirement for the traffic sign when the first position information and the second position information satisfy the preset relationship comprises:
   continuing to determine whether the user's eyes meet conditions which indicates that the user has the detection requirement for the traffic sign, when the first position information and the second position information satisfy the preset relationship; and
   determining that the user has the detection requirement for the traffic sign, when determining that the user's eyes meet conditions which indicates that the user has the detection requirement for the traffic sign.

5. The method of claim 4, wherein the preset relationship includes that a position of the user's eyes, a position of the intersection point between the user's sight and the front windshield glass of the vehicle, and a position of the traffic sign are on an identical straight line; and wherein continuing to determine whether the user's eyes meet conditions which indicate that the user has the detection requirement for the traffic sign, includes: recognizing a contour of the user's eyes through an eye-tracking device; and determining that the user has the detection requirement for the traffic sign when recognizing that the user's eyes open or squint.

6. The method of claim 1, wherein determining geographic location information of the to-be-detected traffic sign includes: determining the geographic location information of the traffic sign according to geographic location information of a vehicle and a binocular camera mounted on the vehicle.

7. The method of claim 1, further comprising:
   sending the geographic location information of the traffic sign and the sign information to a remote server; and
   storing, at the remote server, the geographic location information of the traffic sign and the sign information.

8. A traffic sign detection apparatus for implementing the traffic sign detection method of claim 1, comprising: an image acquisition device, an eye-tracking device, a communication circuit and a processing circuit;
   wherein the processing circuit is coupled with the image acquisition device and the eye-tracking device; the processing circuit is configured to determine geographic location information of a to-be-detected traffic sign according to data obtained from the image acquisition device and the eye-tracking device;

the communication circuit is coupled with the processing circuit; the communication circuit is configured to send a request message for requesting for obtaining sign formation of the traffic sign, and the request message includes the geographic location information of the traffic sign; and the communication circuit is further used to receive the sign formation of the traffic sign corresponding to the geographic location information.

9. A computing device comprising:

one or more processors; and a storage device configured to store one or more programs;

wherein the one or more programs are executed by the one or more processors to enable the one or more processors to implement the traffic sign detection method of claim 1.

10. A non-transitory computer readable storage medium storing a computer program, wherein the computer program is executed by a processor to enable the processor to implement the traffic sign detection method of claim 1.

* * * * *